Aug. 25, 1936.　　　　D. MAPES　　　　2,052,186
AEROPLANE FLOTATION DEVICE
Original Filed Feb. 14, 1931　　4 Sheets—Sheet 2
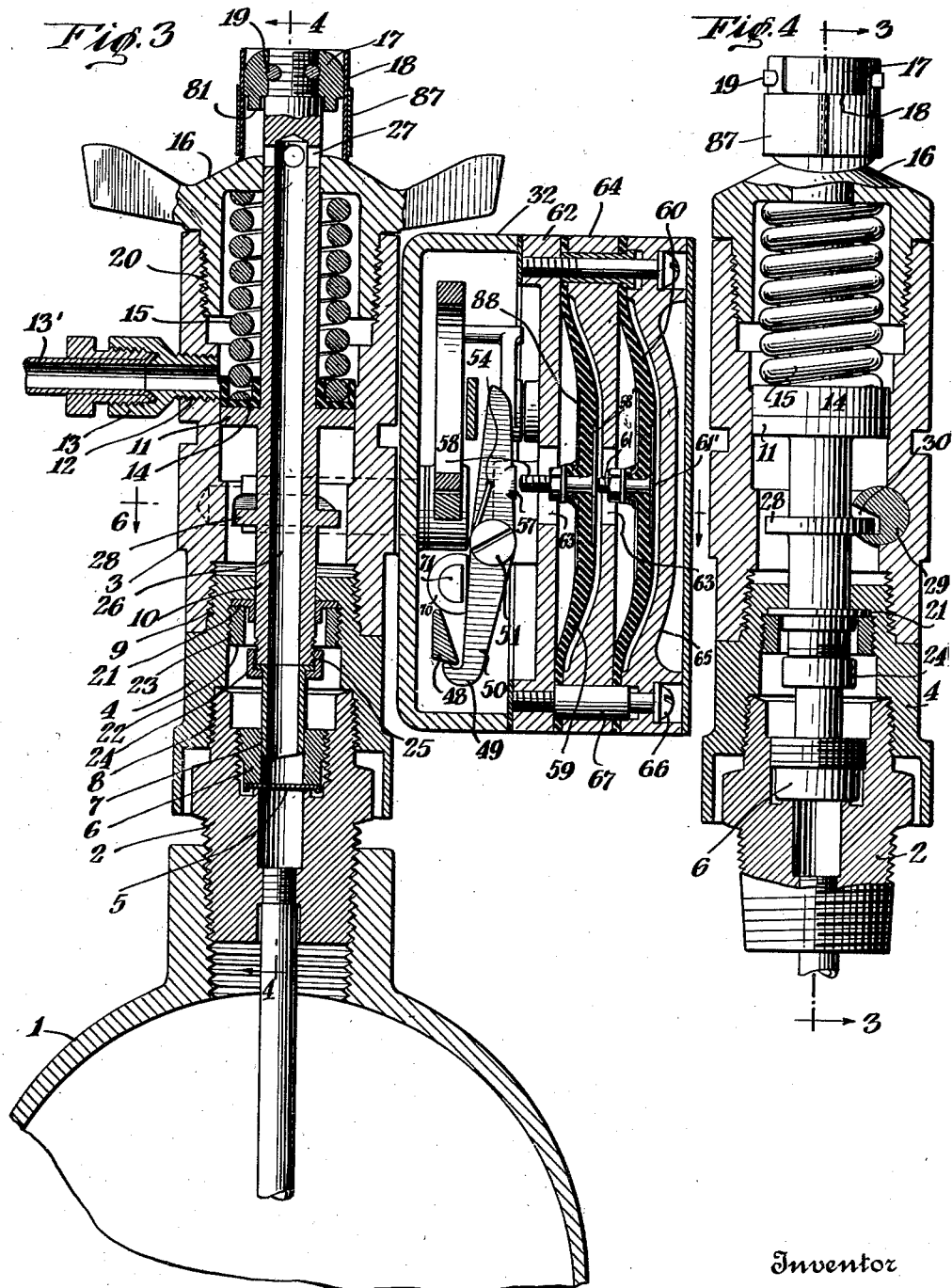
Inventor
Daniel Mapes
By his Attorneys
Redding, Greeley, O'Shea & Campbell Aug. 25, 1936.  D. MAPES  2,052,186
AEROPLANE FLOTATION DEVICE
Original Filed Feb. 14, 1931  4 Sheets-Sheet 3
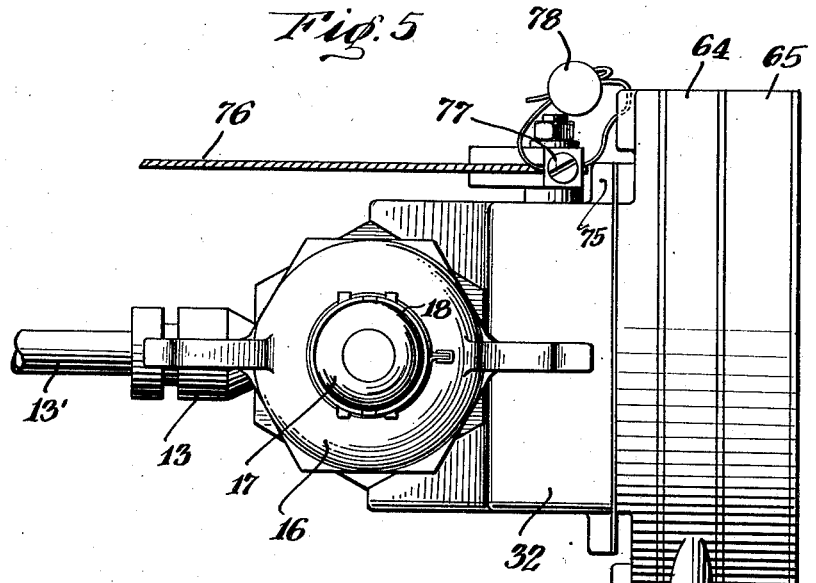
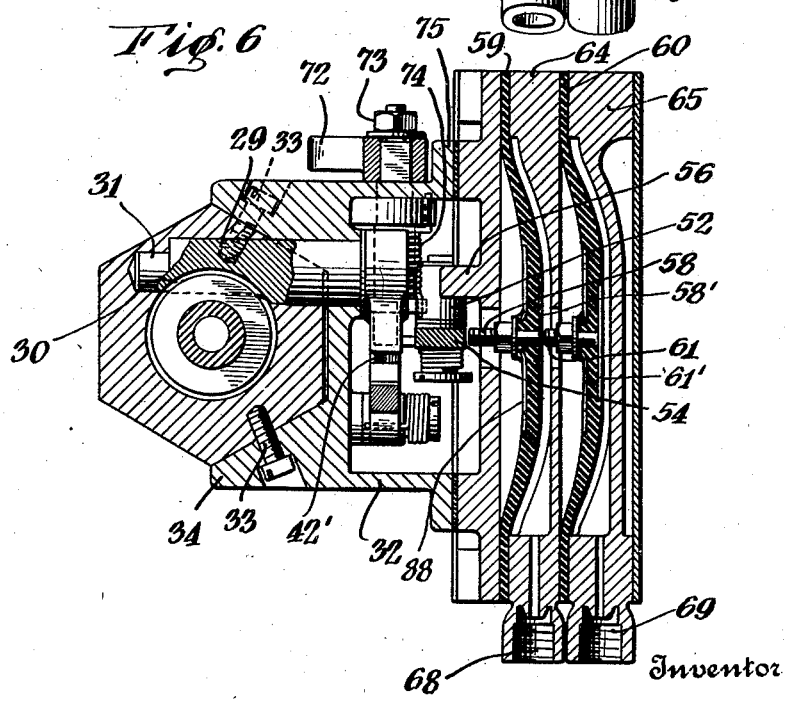
Inventor
Daniel Mapes
By his Attorneys
Redding, Greeley, O'Shea & Campbell

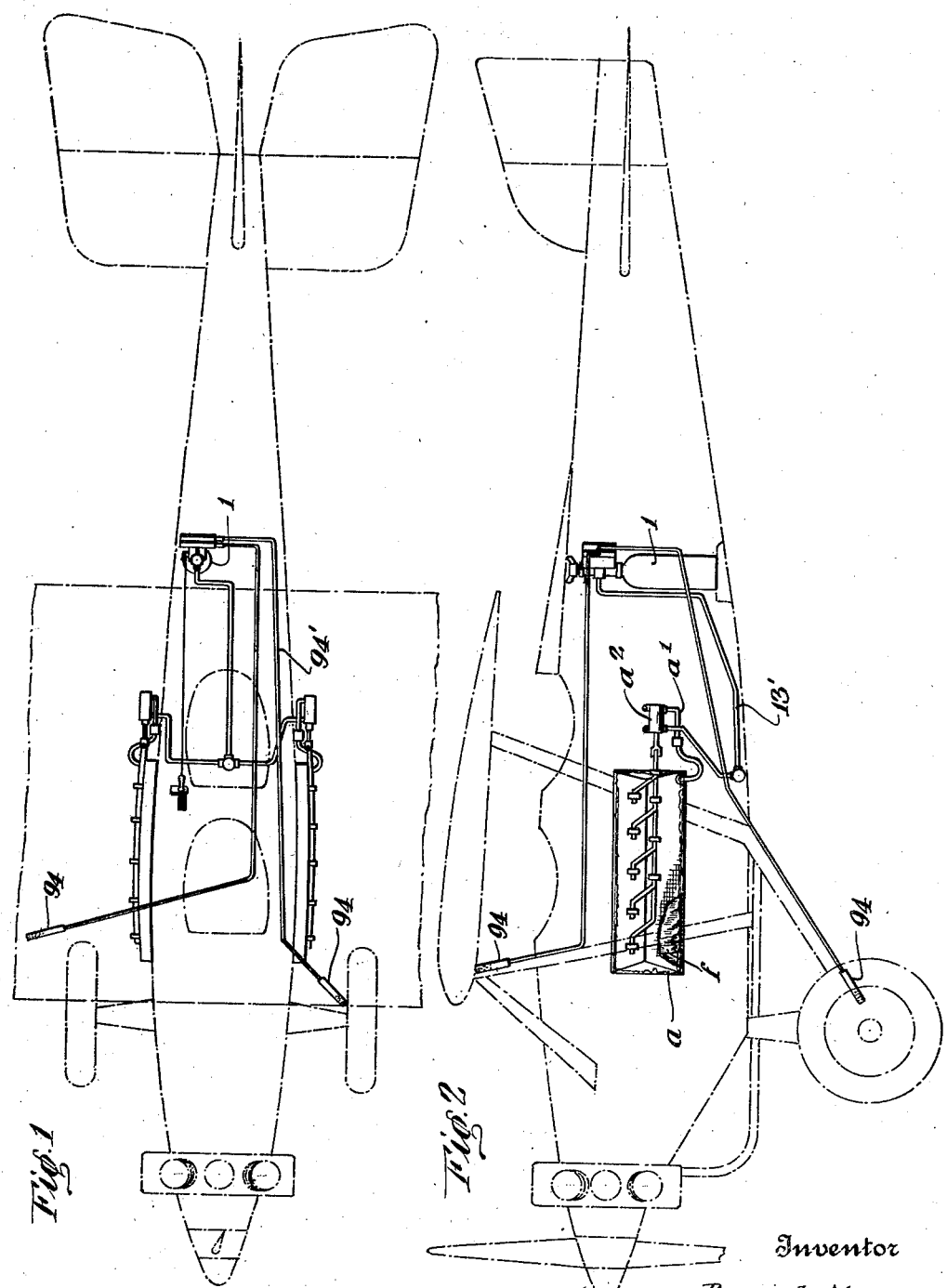

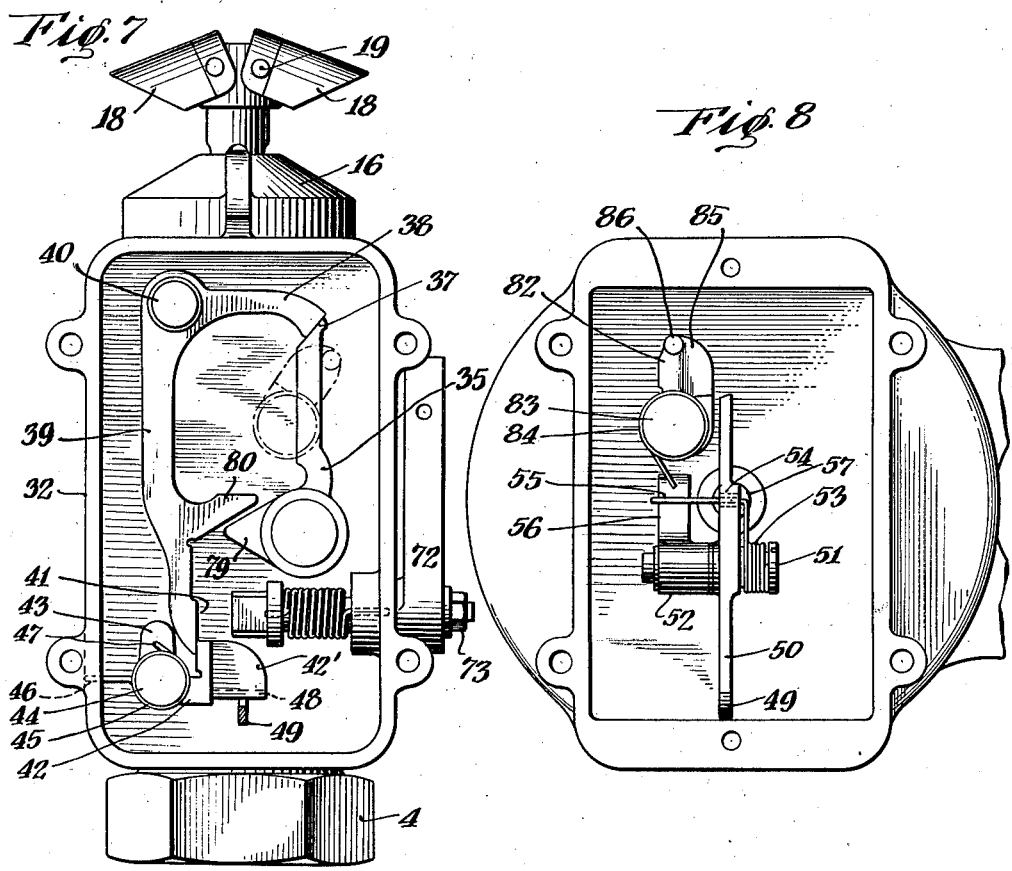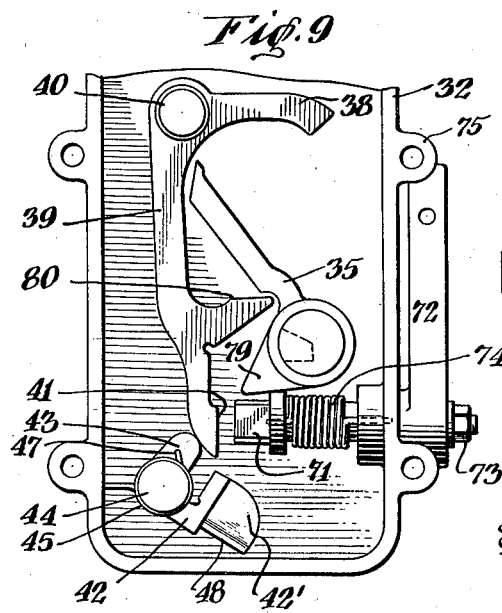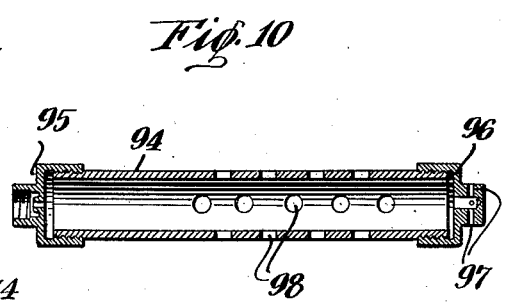

Patented Aug. 25, 1936

2,052,186

UNITED STATES PATENT OFFICE 2,052,186

AEROPLANE FLOTATION DEVICE

Daniel Mapes, Upper Montclair, N. J., assignor to Walter Kidde & Company, Inc., New York, N. Y., a corporation of New York Application February 14, 1931, Serial No. 515,717
Renewed September 7, 1932

85 Claims. (Cl. 244—2)

The present invention relates to flotation equipment for aircraft and embodies, more specifically, an improved mechanism wherein inflatable devices are provided on an aircraft and adapted to be filled with a buoyant fluid when the aeroplane descends upon a body of water. More specifically, the invention embodies, in combination with the mechanism above described, a device for automatically releasing a supply of buoyant fluid under pressure and discharging the same into the inflatable devices when the aircraft alights upon water.

There has recently been developed aeroplane flotation equipment, wherein inflatable bags are provided upon the aircraft and connected by means of suitable pipe lines to a source of gas maintained under pressure. In connection with these recently developed mechanisms, a releasing device has been provided which is actuated by a pilot or other person when it is apparent that the plane must alight upon a body of water, thus affording sufficient buoyancy to enable the plane to float upon the water. In connection with these devices, it is highly important that the gas not be released prior to the alighting of the plane upon the water since the great resistance offered by the inflated devices to the travel of the plane through the air would be dangerous.

To eliminate, as far as possible, the personal equation as a factor in the operation of devices of this character, the present invention has been designed and provides a structure, wherein the supply of buoyant fluid is automatically released to inflate the devices upon contact of the plane with the body of water upon which it is to alight.

A further object of the invention is to provide a system of the above character which functions automatically upon initial contact of the plane with water regardless of whether the plane alights upon the water in the upright, or inverted position.

A further object of the invention is to provide an automatic mechanism for actuating flotation equipment of the above character, wherein advantage is taken of a very slight pressure, such as the static head of six inches of water, to release the inflating mechanism of the equipment.

A further object of the invention is to provide a mechanism of the above character, wherein the elements of the releasing device are so designed as to be capable of manual resetting without difficulty and further to be insensitive to jars or other disturbing stresses while being highly sensitive to a predetermined actuating force.

A further object of the invention is to provide a mechanism which effectively prevents accidental inflation of the equipment upon inadvertent or accidental discharge of the buoyant fluid.

A further object of the invention is to provide a device which affords a desired safety precaution against dangerous increases in pressure and temperature of the confined inflating and buoyant medium, this mechanism being such as to permit the relief of the pressure within the container without discharging the same into the flotation equipment.

A further object of the invention is to provide a device of the above character, wherein means is incorporated for enabling the same to be positively reset without possibility of a faulty setting which would render the system unresponsive to predetermined conditions.

Further objects, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it has been installed, the aeroplane being shown in dot and dash lines.

Figure 3 is a view in transverse section showing a releasing mechanism constructed in accordance with the present invention, taken on line 3—3 of Figure 4, and looking in the direction of the arrows.

Figure 4 is a view in section, taken on line 4—4 of Figure 3, and looking in the direction of the arrows.

Figure 5 is a plan view of the mechanism shown in Figure 3.

Figure 6 is a view in section taken on line 6—6 of Figure 3, and looking in the direction of the arrows.

Figure 7 is a view in elevation, showing the lever chamber with the cover thereof removed.

Figure 8 is a view in elevation, showing the cover of the lever chamber with the mechanism carried thereby.

Figure 9 is a detail view similar to Figure 7, showing the position which the tripping mechanism assumes upon release thereof.

Figure 10 is a detail view in section, showing an actuator adapted to be used in connection with the present invention and providing means for enabling the static pressure of a comparatively low head of water to be utilized to actuate the tripping mechanism described hereinafter.

Referring to the above drawings, particularly Figure 3, a container 1 is provided, within which a supply of a medium under pressure is maintained by means of a closure body 2 and a bonnet 3. An adapter 4 serves to maintain the bonnet upon the closure body, the latter being threaded into the top of the container 1 and being provided with a frangible disc 5 secured in position by a nut 6. A cutter 7 is movable within the nut 6 and the adapter 4 is provided with threads 8 which engage cooperating threads formed on the closure body 2, threads 9 also being provided at the upper extremity of the adapter for engaging cooperating threads formed upon the bonnet 3.

Axially movable within the bonnet is a cutter stem 10 which is formed with a flange 11 having a close-working fit on its circumferential surface with the bore of the bonnet. An outlet 12 is provided in the bonnet for receiving a fitting 13 which is adapted to be connected to a discharge line 13'. The flange 11 on the cutter stem is preferably disposed so as to be nearer the container 1 than the outlet 12, as described in further detail hereinafter.

Before the cutter stem is assembled in the bonnet 3, a cup leather 14 is passed over the upper portion of the stem and seated by a spring 15 which provides the actuating force for moving the cutter and cutter stem toward the container. The spring 15 is seated against a nut 16 which is a combined sealing and resetting nut, a stop 17 being provided on the upper end of the stem to limit the movement of the stem toward the container.

Wing indicators 18 are hinged to the nut at 19 and the above described mechanism constitutes the indicating mechanism to apprise an inspector as to the condition of the apparatus.

The above described cutter stem assembly is inserted in the bonnet 3 and the combined sealing and resetting nut 16 is run into position by means of threads 20 on the bonnet and nut.

Before the adapter 4 is coupled to the closure body 2, it is secured to the bonnet 3, a leather washer 21 being passed over the end of the cutter stem and secured in position by means of a nut 22 having threads 23 which engage the cooperating threads on the adapter 4. The cutter 7 is then secured to the lower end of the cutter stem 10 by means of a coupling nut 24 which is provided with threads 25 engaging cooperating threads on the cutter stem.

In the above described mechanism, the hollow cutter communicates with the hollow portion 26 of the cutter stem, which hollow portion communicates with the atmosphere by means of openings 27 formed in the upper end of the cutter stem. The cutter, adapter, and cooperating securing elements constitute no part of the present invention although the cutter stem and the wing indicator construction, as well as the means for providing communication between the hollow cutter and the atmosphere, constitute important features of the invention.

The normal position of the cutter stem is as shown in Figure 3, the stem being shown in its upper position, the cutter 7 lying some distance above the frangible disc and the openings 27 communicating with the space under the wings. In this fashion, the pressure medium will be discharged into the atmosphere through the cutter 7, cutter stem, and openings 27 when the frangible disc ruptures due to an excessive pressure of the medium within the container 1. A flange 28 is formed on the cutter stem and serves as a catch, this flange being engaged by a suitable trigger releasing mechanism described in detail hereinafter.

Extending within the bonnet is a spindle 29 which is formed with a groove 30 for engaging the flange 28 on the cutter stem. The spindle is pivoted in the bonnet at 31 and extends externally thereof within a lever chamber 32. This lever chamber is secured to the bonnet by means of screws 33 which are inserted into supporting lugs 34 carried on the lever chamber 32.

The foregoing description relates to the disc rupturing mechanism and means for discharging the contents of a fluid container into a pipe line or, in the event that the discharge is accidental, into the atmosphere without possibility of any of the fluid entering the pipe line. The means for releasing the foregoing mechanism will now be described and, in this connection, it will be observed that spindle 29 extends within the lever chamber 32 and has secured to the end thereof a lever 35. A contact surface 37 is formed on the upper end of lever 35 and is adapted to engage a cooperating contact surface on one arm 38 of a bell crank lever having a depending arm 39. Stud 40 pivots the bell crank lever within the chamber 32 and a contact surface 41 is formed on the lower extremity of the depending arm 39. This last named contact surface is adapted to be engaged by a cooperating surface on arm 42 of a bell crank lever having an upwardly extending arm 43 and pivoted upon a stud 44. This second bell crank lever is normally urged into its releasing position by means of a spring 45, one end of which is secured to the wall of the lever chamber at 46 and the other end of which is secured to the arm 43 at 47. The arm 42 is further provided with an ear 42' upon the lower portion of which a camming surface 48 is formed sloping rearwardly from the lower edge of the ear, as viewed in Figure 7.

To normally restrain the second bell crank lever from disengaging arm 39, a catch 49 is provided which engages the camming surface 48. Catch 49 is carried by a tripping lever 50 which is pivoted intermediate its ends on a stud 51 which is secured in a boss 52 carried by the cover of the lever chamber. The catch 49 of the tripping lever is normally urged into engagement with the surface 48 of the second bell crank lever by means of a spring 53 which is anchored at one end to the stud and at the other end passes through an opening in the tripping lever 50, as indicated at 54, and extends beyond the tripping lever so as to rest upon the surface of a second boss 56. The extending portion of the spring is indicated at 55 and will be clearly seen in Figure 8.

From an inspection of Figure 3, it will be seen that the ends of tripping lever 50 do not engage either the lever chamber or the cover therefor and the tripping lever thus floats about its pivoting stud 51. The lever is thus yieldingly maintained in such floating position by means of the extension 55 on the spring 53 which engages the boss 56 and prevents the upper end of the lever from engaging the chamber cover. The foregoing construction overcomes a serious difficulty which has been encountered in previous designs wherein the extreme vibrations impressed upon mechanism of this character in service upon aircraft have been found to cause the accidental tripping of the mechanism. It will further be noted that the accidental tripping of the lever 50 as by vibrations, etc., is resisted by the inclination of the camming surface 48 in such fashion that the lever system must be slightly moved in a direction opposite from its tripping movement before the tripping lever can be disengaged from the surface 48. This movement is, of course, against the force of the spring 15 and serves as a positive deterrent to the accidental tripping of the mechanism. It will also be seen that the catch 49 is designed to cause it to have a substantial line contact with the surface 48. This overcomes the tendency toward creeping where two plane surfaces have exerted thereon forces tending to cause movement therebetween. Where constant vibrations are impressed upon mechanism, particularly of this character and used in aircraft, it is highly desirable to eliminate such creeping and the line contact with surface 48 has been found to eliminate such tendency effectively.

To effect the releasing movement of tripping lever 50, a boss 57 is formed thereon and is adapted to be engaged by a pin 58 which is carried by a diaphragm assembly 59. A similar diaphragm assembly 60 carries a pin 61 which is adapted to engage one face of the diaphragm 59 and move the same axially to cause the pin 58 to engage the boss 57. The foregoing elements are assembled by first positioning the cover 62 for the lever chamber 32 in assembled position and then applying the diaphragm assembly 59, together with the spacer 64. The diaphragm assembly 60 and diaphragm cover 65 are then applied and screws 66, which pass through sleeves 67, are then tightened until the elements are securely mounted in position. The spacer 64 and cover 62 are provided with axial openings 63 to provide communication between the diaphragm members and the mechanism of the lever chamber. These openings further accommodate movement of the pins 58 and 61 to transmit the movement of the diaphragms to the lever 50 and boss 57. It will thus be seen that a chamber exists between the diaphragm assemblies 59 and 60 in which a pressure may be built up to actuate pin 58. A second chamber exists between the diaphragm assembly 60 and the diaphragm cover 65, this chamber being adapted to receive a pressure medium for moving both the pins 61 and 58. A connection 68 is provided for introducing a fluid into the chamber between the diaphragms, and a connection 69 enables a similar condition to be created in the chamber between the diaphragm assembly 60 and the assembly 65. The manner in which a fluid is introduced through these connections will be described in further detail hereinafter.

The operation of the diaphragm and tripping mechanism will be seen to be initiated by axial movement of pin 58 against the boss 57. This moves the catch 49 from under the surface 48 and permits the second bell crank lever to rotate in a clockwise direction, as viewed in Figure 7. In this fashion, face 41 of depending arm 39 is disengaged and the first bell crank lever partakes of counter clockwise movement, as viewed in Figure 7. Arm 38 of the first bell crank lever thus disengages contact surface 37 and permits spindle 29 to turn under the force exerted by spring 15 to disengage groove 30 from the flange 28. Such disengagement permits the cutter 7 to be advanced into the disc 5 and effects the rupturing thereof, simultaneously moving the ports 27 to communicate with the region within the nut 16 and bonnet 3 and thus causing the discharged medium to flow into pipe line 13'.

With reference to Figures 1 and 2, the inflatable devices f are seen to be enclosed within suitable envelopes a. Pipe line a' and releasing mechanism $a^2$ receive fluid from the pipe line 13'. At two points upon the plane, preferably adjacent the top and bottom thereof, means is provided for creating a pressure within the diaphragm chambers described above, this pressure being created by a small head of water when the plane alights upon a body of water. The means for creating such pressure will be seen to include two actuators 94 which are mounted adjacent the top of the wing and the bottom of the landing mechanism of the aircraft. Pipe lines 94' connect the actuators with the respective connections 68 and 69 and the operation of the actuators will be described in further detail hereinafter.

In order to release the apparatus manually there is provided a shaft 70 formed with a flat surface 71. This flat surface is adapted to engage the lever 50 and, upon rotation of the shaft 70, move the lever in a counterclockwise direction, as viewed in Figure 3. A manual releasing lever 72 is secured to the outer end of shaft 70 by means of a nut 73, and spring 74 is provided for urging the shaft normally into the position shown in Figure 3. In this position, the lever 72 engages a projection 75 on the chamber 32 and the manual mechanism thus remains in a position of repose. A manually operated cable 76 is secured to the lever 72 by means of a screw 77 and, if desired, a seal 78 may be provided to deter tampering with the apparatus.

To reset the cutter stem and its lever system after the apparatus has been operated, cooperating cam and stop surfaces are provided on the several levers to facilitate such operation. As has already been explained, the groove 30 in spindle 29 normally restrains the downward movement of the cutter stem. The lower face of this groove exerts this restraining effect upon the stem and, upon upward movement of the spindle, the flange on the stem engages the upper surface of the groove to rotate the spindle in a clockwise direction, as viewed in Figure 4. For this purpose, it will be seen that the upper surface of the groove tapers outwardly to serve as a cam during such resetting operation. While the cutter stem is being retracted to its normal position, a projection 79 on lever 35 engages a cooperating projection 80 on the downwardly depending arm 39 of the first bell crank lever. Continued movement of the spindle moves the first bell crank lever in a clockwise direction so that the lower extremity of depending arm 39 engages arm 43 of the second bell crank lever to rotate the same in a counterclockwise direction, against the disengaging effect of spring 45. This movement continues until the catch 49 of the tripping lever 50 snaps over the edge of the arm 42 and engages the surface 48. The lever system is now completely reset.

The foregoing operation is effected by axial movement of the cutter stem upwardly, such movement being effected in the following manner. After the cutter has been advanced into the frangible disc, the lower surface 81 of the stop nut 17 rests against the upper surface of the resetting nut 16. This nut is then backed away as far as possible, that is, when lever 35 has been turned as far as it will go in a clockwise direction, and the reset nut 16 is then rotated in the opposite direction. During the first portion of such return movement of the reset nut, the contact surface 37 of lever 35 engages the cooperating contact surface of the first bell crank lever, thus locking the lever mechanism against the effect of spring 15 and permitting the continued movement of the reset nut 16 to compress the spring 15 to the normal extent. It is to be noted that the spring 15 is not under tension during the resetting of the lever system itself but that the spring is compressed to its normal position after the lever system has been restored to its normal restraining position. A resulting advantage of the foregoing is that the resetting operation is accomplished easily and without imposing any strain upon the levers. Assurance is furthermore had that the lever system has been reset since the mechanism must be moved to a stopped position in one direction.

It will thus be seen that the mechanism is constructed in such fashion that it may, within itself, be reset and additional resetting equipment is thus not required. The very mechanism which effects the tripping and disengagement of the cutter stem also serves as the means whereby the resetting operation is accomplished.

To prevent a partial resetting of the foregoing system, for example, the jarring of the second bell crank lever into engagement with the arm 39 of the first bell crank lever with consequent engagement of the tripping lever 50 with the surface 48 without return of the cutter stem to its normal position and the consequent engagement of the contact surface 37 of the lever 35 with the corresponding contact surface of arm 38, there is provided a locking cam shown at 82. This cam is pivoted on a stud 83 and is normally urged by spring 84 toward locking engagement with the upper end of tripping lever 50. To facilitate such locking engagement, a wedge-shaped surface 85 is formed on the lever 82 and cams against the upper end of the tripping lever 50 to force the said end in a counterclockwise direction, as viewed in Figure 3. This moves the catch 49 away from the surface 48 and prevents engagement therewith as long as the locking cam is back of lever 50. A projection 86 is provided on the locking cam 82 and extends in the direction of the arm 35 and beyond the plane thereof. This projection is adapted to be engaged by the lever 35 to cause the lever 35 to hold the projection and locking cam out of engagement with the tripping lever 50. When the lever 35 is released, the locking cam is likewise released and engages the lever 50 to hold it out of engaging position until the arm 35 is returned substantially to its normal position, as viewed in Figure 7. In this fashion, the second and first bell crank levers cannot be reset without also resetting the cutter stem and associated mechanism.

In order that a suitable indication may be made upon discharge of the medium within the container, the wings 18 (previously referred to) are provided and are moved into the position shown in Figure 7 upon discharge of the medium through the apertures 27. The outer surface of the wing indicators are preferably colored distinctively, as with a bright red color. Around the exterior surface of the wing indicators is secured a band of a suitable easily rupturable material, such as celluloid, this band serving to conceal the color of the wing indicators and at the same time being preferably of some distinctive color other than the color of the indicators as, for example, green. This band is indicated at 87 in Figure 3 and may be secured in any fashion, such as by clamping at its ends. As long as the green band is not disturbed, it will be apparent that the system has not functioned either intentionally or accidentally. If the pressure medium should be released due to reaching a high temperature, the pressure of the medium discharging through the openings 27 will rupture the band 87 and swing the indicators into the position shown in Figure 7. Upon the cessation of discharge, the indicators will return to their vertical positions and still display the distinctive color (red) to indicate that the pressure medium has been accidentally released. On the other hand, when the pressure medium is intentionally released by the actuation of cutter stem 10, the descent of the stem will cause forcible engagement of the lower edge of each wing indicator with the inclined upper surface of the combined sealing and reset nut 16, so that the indicators will be mechanically forced outwardly to rupture the band 87. In this case, the distinctive red color of the wing indicators will indicate that the pressure medium has been released and the angular position of the indicators will further establish the operation as one initiated intentionally or by means of the automatic releasing mechanism described above.

In mechanisms of this character it is highly desirable that the elements thereof be responsive to extremely slight differences of pressure, such as a six inch head of water. An exhaustive study of this subject has led to the development of an improved form of diaphragm which is used in connection with the present device, this diaphragm being an integral and highly important part of the releasing mechanism embodied in the present invention. The diaphragm consists of a circular sheet of rubber-like material thickened centrally of its circumference and additionally stiffened by a thin disc of flexible material 88. Although not necessarily so, this disc is shown as lying flush with one face of the diaphragm and formed with a central opening to receive the pins 58 and 61. The pins 58 and 61 are formed with enlarged heads 58' and 61', thus affording a bearing surface for transmitting the force of adjacent pins to the tripping lever, as well as serving as a washer for effectively securing the diaphragm to the thin disc and the respective pins. The diaphragm is preferably molded with a bulge in a direction opposite to that in which the operating pressure is applied to prevent the tendency of the diaphragm to assume a permanent set after an operating pressure has been applied. The diaphragm thickness preferably decreases toward the periphery thereof, as seen in Figure 3, to increase the sensitivity thereof.

Upon applying pressure to the left hand diaphragm through the connection 68, the right hand diaphragm will be forced toward the right and to prevent undue movement of the right hand diaphragm under these conditions the diaphragm cover is preferably adapted to lie quite close to the diaphragm 60. In this fashion, the necessary pressure for operating the left hand diaphragm can be built up quickly.

The specific form of actuator which has been found to be highly effective in systems of this character is illustrated in Figure 10. It is desirable that the actuators be connected to the respective pressure chambers by a length of small diameter small bore tubing. The difficulty heretofore encountered in transmitting the actuating pressure to the actuating diaphragm by simply dipping the small bore tubing into water has been overcome by the present construction. Due to the small bore of the tubing there is a tendency to retard the entry of the water into the tubing with a result that the tubing must be immersed to a much greater depth than desired before actuation of the diaphragm can be accomplished. In this connection, it will be understood that the actuating fluid does not itself normally reach the diaphragm chamber but in the case of a liquid actuating fluid, the pressure is transmitted to the diaphragm chamber by compression of the air normally contained therein and in the tubing leading to the chamber.

To overcome the resistance to the flow of the liquid in the small bore tubing, an actuator barrel 94 has been provided which is of considerably larger diameter than the small bore tubing. The actuator barrel is connected to the tubing by a coupling member 95 and is substantially closed at the other end by means of a cap 96. Perforations 98 are formed in the barrel 94 and adjacent the end to which the cap 96 is secured. It is preferred that the perforations do not extend to the fitting 95 in order that a chamber may be provided adjacent this end of the actuator in which a pressure may be produced by the head of the liquid in which the actuator is immersed. The reason for capping the lower end of the barrel is to prevent actuation of the diaphragm due to a pressure wave caused by the barrel being placed in a rapidly moving air stream such, for example, as would be encountered if the barrel were pointed toward the nose of an aeroplane, etc. The cap 96 is provided with radial openings 97 for draining any water which collects within the barrel and, in as much as these openings are radial, the wind pressure exterially of the barrel will not be transmitted to the interior thereof. The perforations 98 are so formed as to prevent the transmission of pressure waves to the actuating mechanism due to wind pressure externally of the barrel. To this effect the axes of the perforations preferably lie perpendicular to the axis of the barrel.

From the foregoing description it will be apparent that a releasing mechanism has been provided for systems of the above character wherein automatic operation is effected when the plane alights on water, the apparatus not being susceptible of premature operation or delayed operation by an excited pilot or passenger. The manual releasing feature is, however, provided for use in the event of an emergency.

The shock-proof detent mechanism provides a highly effective means for releasing the pressure medium, and the diaphragm mechanism for actuating the detent mechanism is of such character as to be responsive to very slight pressure differentials. These elements will be readily apparent to be susceptible of use in connection with many types of mechanisms, wherein an analogous function is employed. It will further be seen that the pressure medium can, under no conceivable circumstances be accidentally introduced into the pipe line when the releasing mechanism has not been actuated since there is but a single two position valve for controlling the flow of such medium. One of the valve positions discharges the medium into the atmosphere and the other valve position discharges it into the pipe line. Cooperating with this mechanism is the indicating device which is simple of construction and effective to disclose the condition of the apparatus. As previously set forth, the detent mechanism is of such character as to be adapted for resetting without requiring additional apparatus or involved resetting operations. This detent mechanism is further provided with means for preventing the partial resetting of the apparatus and the entire equipment is thus highly effective and sensitive to predetermined conditions while being equally non-responsive to conditions which would otherwise prove to be disturbing.

While the invention has been described with specific reference to the accompanying drawings, it is not to be limited, save as defined in the appended claims.

I claim as my invention:

1. A container for a medium under pressure, a supply pipe adapted to receive the medium, a coupling between the pipe and container, means carried by the coupling to release the medium, and a valve actuated by the releasing means to direct the medium into the supply pipe.

2. A container for a medium under pressure, a supply pipe adapted to receive the medium, a coupling between the pipe and container, a hollow medium releasing means carried by the coupling and adapted to receive the medium from the container, said releasing means being formed with an aperture cooperating with the coupling to direct the medium into the supply pipe.

3. A container for a medium under pressure, a supply pipe adapted to receive the medium, a coupling between the pipe and container, a hollow medium releasing means carried by the coupling and adapted to receive the medium from the container, said releasing means being formed with an aperture normally open to the atmosphere and movable with the means to cooperate with the coupling to direct the medium into the supply pipe.

4. A container for a medium under pressure, a supply pipe adapted to receive the medium, a coupling between the pipe and container, a hollow medium releasing means carried by the coupling and adapted to receive the medium from the container, said releasing means being formed with an aperture normally open to the atmosphere and movable within the coupling to communicate with the supply pipe, means to urge the medium releasing means toward the container, and releasable means to prevent movement of the medium releasing means toward the container.

5. A container for a medium under pressure, a supply pipe adapted to receive the medium, a chambered coupling between the pipe and container, a hollow medium releasing means movable axially in the coupling, a flange on the medium releasing means engaging the chamber walls, said flange lying between the supply pipe and the container, and said medium releasing means being formed with an aperture to communicate normally with the atmosphere and movable with the medium releasing means to a position within the chamber to communicate with the pipe.

6. A container for a medium under pressure, an outlet through which the medium is discharged, a chambered coupling between the outlet and container, a hollow medium releasing means movable axially in the coupling, a flange on the means engaging the chamber walls, said flange lying between the outlet and the container and said medium releasing means being formed with an aperture to communicate normally with the atmosphere and movable with the releasing means to a position within the chamber to communicate with the outlet, a second flange on the medium releasing means, and a restraining means normally engaging the second flange to prevent movement of the medium releasing means.

7. A container for a medium under pressure, an outlet through which the medium is discharged, a chambered coupling between the outlet and container, a nut threaded on the coupling and forming a closure for the coupling chamber, a hollow medium releasing means axially slidable in the coupling and nut, a flange on the means, a spring mounted between the flange and nut, and means on the medium releasing means engaging the nut to limit movement thereof.

8. A container for a medium under pressure, an outlet, a chambered coupling between the outlet and container, a medium releasing means movable in the coupling, means to actuate the releasing means, an indicator, and means actuated by the medium releasing means to actuate the indicator.

9. A container for a medium under pressure, an outlet, a chambered coupling between the outlet and container, a medium releasing means movable in the coupling, means to actuate the releasing means, and an indicator connected to the releasing means.

10. A container for a medium under pressure, an outlet, a chambered coupling between the outlet and container, a medium releasing means movable in the coupling, means to actuate the releasing means, and an indicator mounted on the releasing means.

11. A container for a medium under pressure, an outlet, a chambered coupling between the outlet and container, a medium releasing means slidably mounted in the coupling and extending exteriorly thereof, means to actuate the releasing means, and an indicator mounted on the releasing means exteriorly of the coupling and adapted to engage the coupling upon movement of the releasing means.

12. A container for a medium under pressure, an outlet, a chambered coupling between the outlet and container, a medium releasing means slidably mounted in the coupling and extending exteriorly thereof, means to actuate the releasing means, and an indicator mounted on the releasing means exteriorly of the coupling and formed with a face adapted to engage the coupling and move the indicator into a display position upon movement of the means.

13. A container for a medium under pressure, an outlet, a chambered coupling between the outlet and container, a hollow medium releasing means movable in the coupling and extending exteriorly thereof, said releasing means having an aperture on the exterior extension, means to actuate the releasing means, and an indicator on the exterior extension having a portion spaced from the aperture.

14. A container for a medium under pressure, an outlet, a chambered coupling between the outlet and container, a hollow medium releasing means movable in the coupling and extending exteriorly thereof, said releasing means having an aperture on the exterior extension, means to actuate the releasing means, and an indicator pivoted on the exterior extension having a portion spaced from the aperture and adapted to engage the coupling upon movement of the releasing means.

15. A container for a medium under pressure, an outlet, a chambered coupling between the outlet and container, a hollow medium releasing means movable in the coupling and extending exteriorly thereof, said releasing means having an aperture on the exterior extension, means to actuate the releasing means, and an indicator pivoted on the exterior extension having a portion spaced from the aperture and adapted to engage the coupling upon movement of the releasing means, said indicator bearing a distinguishing indicia.

16. A container for a medium under pressure, an outlet, a chambered coupling between the outlet and container, a hollow medium releasing means movable in the coupling and extending exteriorly thereof, said releasing means having an aperture on the exterior extension, means to actuate the releasing means, an indicator pivoted on the exterior extension having a portion spaced from the aperture and adapted to engage the coupling upon movement of the releasing means, said indicator bearing a distinguishing indicia, and means to conceal the indicia normally.

17. A container for a medium under pressure, an outlet, a chambered coupling between the outlet and container, a hollow medium releasing means movable in the coupling and extending exteriorly thereof, said releasing means having an aperture on the exterior extension, means to actuate the releasing means, an indicator pivoted on the exterior extension having a portion spaced from the aperture and adapted to engage the coupling upon movement of the releasing means, said indicator bearing a distinguishing indicia, and means rupturable by movement of the indicator to conceal the indicia normally.

18. A container for a medium under pressure, an outlet, a coupling between the container and outlet, means in the coupling to release the medium, means to restrain the releasing means, a lever normally holding the last named means in a restraining position, and means actuated by the restraining means to reset the lever by movement of the said restraining means.

19. A container for a medium under pressure, an outlet, a coupling between the container and outlet, means in the coupling to release the medium, means to restrain the releasing means, a lever normally holding the last named means in a restraining position, and means actuated by the releasing means to reset the lever by movement of the said releasing means.

20. A container for a medium under pressure, an outlet, a coupling between the container and outlet, means in the coupling to release the medium, means to restrain the releasing means, a train of levers normally holding the last named means in restraining position, means to release the levers, and means to reset the levers by movement of the first restraining means.

21. A container for a medium under pressure, an outlet, a coupling between the container and outlet, means in the coupling to release the medium, means to restrain the releasing means, a lever normally holding the last named means in a restraining position, means to release the lever, means on the coupling to return the fluid releasing means to its normal position, and means actuated upon such return movement to reset the lever.

22. A container for a medium under pressure, an outlet, a coupling between the container and outlet, means in the coupling to release the medium, means to restrain the releasing means, a train of levers normally holding the last named means in restraining position, means to release the levers, means on the coupling to return the fluid releasing means to its normal position, and positive mechanical means actuated by such means to reset the levers.

23. A container for a medium under pressure, an outlet, a coupling between the container and outlet, means in the coupling to release the medium, a spindle rotatably mounted in the coupling, means on the spindle to engage the releasing means to restrain movement thereof toward the container, means to engage the spindle to hold the same in a restraining position, and means to reset the spindle by movement of the releasing means in the opposite direction.

24. A container for a medium under pressure, an outlet, a coupling between the container and outlet, means in the coupling to release the medium, a spindle rotatable in the coupling for restraining the releasing means, means carried by the coupling and forming a lever chamber, a lever mounted in the chamber, an arm on the lever engaging the spindle, a catch engaging the lever, a shoulder on the lever, and an arm on the spindle engaging the shoulder to effect resetting of the lever and catch by rotation of the spindle toward its restraining position.

25. A container for a medium under pressure, an outlet, a coupling between the container and outlet, means in the coupling to release the medium, a spindle rotatable in the coupling for restraining the releasing means, means carried by the coupling and forming a lever chamber, a lever mounted in the chamber, an arm on the lever engaging the spindle, a catch engaging the lever, a shoulder on the lever, an arm on the spindle engaging the shoulder to effect resetting of the lever and catch by rotation of the spindle toward its restraining position, and means actuated by the spindle to insure resetting of the spindle upon resetting of the lever and catch.

26. A container for a medium under pressure, an outlet, a coupling between the container and outlet, means in the coupling to release the medium, a spindle rotatable in the coupling for restraining the releasing means, means carried by the coupling and forming a lever chamber, a lever mounted in the chamber, an arm on the spindle, an arm on the lever engaging the spindle arm, a catch restraining movement of the arm, means to release the catch, and means between the catch and catch releasing means to move the catch in a non-releasing direction prior to effecting its release.

27. A container for a medium under pressure, an outlet, a coupling between the outlet and container, means to release the medium, restraining means to prevent the actuation of the releasing means normally, and means connecting the restraining and releasing means to cause initial movement of the restraining means in a restraining direction prior to its releasing movement.

28. A container for a medium under pressure, an outlet, a coupling between the outlet and container, means to release the medium, restraining means to prevent the actuation of the releasing means normally, a catch for engaging the restraining means, and means connecting the catch and restraining means forming a line contact therebetween.

29. A container for a medium under pressure, an outlet, a coupling between the outlet and container, means to release the medium, restraining means to prevent the actuation of the releasing means normally, a catch for engaging the restraining means, and means connecting the catch and restraining means forming a line contact therebetween, said means causing movement of the restraining means in a restraining direction initially upon disengaging of the catch from the restraining means.

30. A container for a medium under pressure, an outlet, a coupling between the outlet and container, means to release the medium, restraining means to prevent the actuation of the releasing means normally, a catch for engaging the restraining means, a second catch engaging the first catch with a line contacting element, and a cam on the first catch engaged by said element to cause movement of the first catch initially in an engaging direction prior to its release.

31. A container for a medium under pressure, an outlet, a coupling between the outlet and container, means to release the medium, restraining means to prevent the actuation of the releasing means normally, means to pivot the restraining means for movement in either direction from a normal restraining position, and means to resist, yieldingly, movement of the restraining means.

32. A container for a medium under pressure, an outlet, a coupling between the outlet and container, means to release the medium, a lever engaging the releasing means, means to pivot the lever for movement in either direction from a normal restraining position, a spring to resist movement of the lever in one direction, and an extension on the spring for resisting movement of the lever in the opposite direction.

33. A container for a medium under pressure, an outlet, a coupling between the outlet and container, means to release the medium, a lever engaging the releasing means, a mounting for pivoting the lever for movement in either direction from a normal restraining position, a boss on the mounting, a spring passing through the lever for resisting movement thereof in one direction, and an extension on the spring engaging the boss to resist movement of the lever in the opposite direction.

34. A container for a medium under pressure, an outlet, a coupling between the outlet and container, means to release the medium, a spindle for restraining the releasing means, a lever engaging the spindle, a catch engaging the lever, releasing means for the catch, and an interlock between the spindle and catch releasing means.

35. A container for a medium under pressure, an outlet, a coupling between the outlet and container, means to release the medium, a spindle for restraining the releasing means, an arm on the spindle, a lever engaging the arm to prevent normal movement thereof in a releasing direction, a catch engaging the lever to prevent release thereof normally, a lever engaging the catch to restrain the release thereof, and means actuated by the spindle arm to cause resetting of the catch and second lever upon resetting of the catch, first lever, and arm.

36. A container for a medium under pressure, an outlet, a coupling between the outlet and container, means to release the medium, a spindle for restraining the releasing means, an arm on the spindle, a lever engaging the arm to prevent normal movement thereof in a releasing direction, a catch engaging the lever to prevent release thereof normally, a lever engaging the catch to restrain the release thereof, and a lever actuated by the spindle arm to engage the second lever to insure resetting the catch and second lever upon resetting of the catch, first lever, and spindle arm.

37. A container for a medium under pressure, an outlet, a coupling between the outlet and container, means to release the medium, a spindle for restraining the releasing means, an arm on the spindle, a lever engaging the arm to prevent normal movement thereof in a releasing direction, a catch engaging the lever to prevent release thereof normally, a lever engaging the catch to restrain the release thereof, a spring urged lever normally urged toward the last named lever to prevent its engagement with the catch, and means on the spring urged lever to move the same out of engaging position upon movement of the spindle arm to a normal restraining position.

38. A container for a medium under pressure, an outlet, a coupling between the outlet and container, means in the coupling to release the medium, a spindle journaled in the coupling, a flange on the releasing means for engaging the spindle, an arm on the spindle, a lever having an arm normally engaging the spindle arm to prevent movement thereof, a shoulder on the lever, a resetting arm on the spindle for engaging the shoulder, a catch for restraining movement of the lever, means between the catch and lever to reset the catch by movement of the lever toward a spindle restraining position, and means to disengage the catch from the lever.

39. A container for a medium under pressure, an outlet, a coupling between the outlet and container, means in the coupling to release the medium, a spindle journaled in the coupling, a flange on the releasing means for engaging the spindle, an arm on the spindle, a lever having an arm normally engaging the spindle arm to prevent movement thereof, a shoulder on the lever, a resetting arm on the spindle for engaging the shoulder, a catch for restraining movement of the lever, means between the catch and lever to reset the catch by movement of the lever toward a spindle restraining position, a second lever having a portion engaging the catch, and a spring to urge the second lever normally into engagement with the catch.

40. A container for a medium under pressure, an outlet, a coupling between the outlet and container, means in the coupling to release the medium, a spindle journaled in the coupling, a flange on the releasing means for engaging the spindle, an arm on the spindle, a lever having an arm normally engaging the spindle arm to prevent movement thereof, a shoulder on the lever, a resetting arm on the spindle for engaging the shoulder, a catch for restraining movement of the lever, means between the catch and lever to reset the catch by movement of the lever toward a spindle restraining position, a second lever having a portion engaging the catch, a spring to urge the second lever normally into engagement with the catch, and means actuated by the spindle to move the second lever into disengaging position upon movement of the spindle to a releasing position.

41. A container for a medium under pressure, an outlet, a coupling between the outlet and container, means in the coupling to release the medium, a spindle journaled in the coupling, a flange on the releasing means for engaging the spindle, an arm on the spindle, a lever having an arm normally engaging the spindle arm to prevent movement thereof, a shoulder on the lever, a resetting arm on the spindle for engaging the shoulder, a catch for restraining movement of the lever, means between the catch and lever to reset the catch by movement of the lever toward a spindle restraining position, a second lever having a portion engaging the catch, a spring to urge the second lever normally into engagement with the catch, means to move the second lever into a disengaged position, and means actuated by the first spindle arm to render the last named means ineffective upon movement of the spindle to a restraining position.

42. Means to discharge a medium under pressure, restraining means for the discharging means, means to release the restraining means, fluid pressure operated means for operating the releasing means, and a manually rotatable flattened shaft for engaging the releasing means to actuate the same.

43. A flotation bag carried upon an aircraft, a supply of fluid under pressure for inflating the bag, releasing means for introducing the fluid into the bag, an actuator comprising a chambered member communicating with the atmosphere, a chambered member associated with the releasing means, a diaphragm in the last named chambered member and adapted to actuate the releasing member, and a conduit communicating between the actuator and the diaphragm chamber.

44. A releasing mechanism, a chambered member associated therewith, a plurality of diaphragms mounted in the chamber, means to actuate the releasing member by the diaphragms, means to apply a pressure between the diaphragms to act operatively on one of the diaphragms, and means to apply a pressure upon the other of the diaphragms.

45. A releasing mechanism, a chambered member associated therewith, a plurality of diaphragms mounted in the chamber, means on the diaphragm adjacent the releasing mechanism to actuate the same, means to apply a pressure between the diaphragms, and means to apply a fluid pressure only upon the diaphragms distant from the releasing means.

46. A releasing mechanism, means carried thereby forming a plurality of chambers, the chambers being in communication, a diaphragm mounted in each chamber, means on the diaphragm adjacent the releasing mechanism for actuating said mechanism, means to introduce a fluid pressure between the diaphragms, and means to apply a fluid pressure only upon the diaphragm distant from the releasing mechanism.

47. A releasing mechanism, means carried thereby forming a plurality of chambers, the chambers being in communication, a diaphragm mounted in each chamber, means on the diaphragm adjacent the releasing mechanism for actuating said mechanism, means to introduce a fluid pressure between the diaphragms, and means to apply a fluid pressure only upon the diaphragm distant from the releasing mechanism, the diaphragm distant from the releasing mechanism lying in close proximity to the wall of its chamber.

48. A container for a medium under pressure, an outlet, a coupling between the outlet and container, an axially movable releasing means in the coupling, a closure for the coupling receiving the releasing means slidably and having a threaded engagement with the coupling, and a spring seated on the closure within the coupling and engaging the releasing means.

49. A fluid container for mediums under pressure, an outlet, a coupling between the outlet and container, axially movable releasing means in the coupling, a flange on the releasing means, a nut on the coupling, a spring between the nut and flange, and a stop on the releasing means for engaging the nut.

50. A fluid container for mediums under pressure, an outlet, a coupling between the outlet and container, axially movable releasing means in the coupling, a flange on the releasing means, a nut on the coupling, a spring between the nut and flange, a spindle journaled in the coupling and having means for engaging the flange, and means for restraining movement of the spindle to hold the releasing means in a normal non-releasing position.

51. A fluid container for mediums under pressure, an outlet, a coupling between the outlet and container, axially movable releasing means in the coupling, a flange on the releasing means, a nut on the coupling, a spring between the nut and flange, a spindle journaled in the coupling and having a groove formed with diverging walls for engaging the flange, and means for restraining movement of the spindle to hold the releasing means in a normal non-releasing position.

52. A releasing mechanism, a plurality of diaphragms, means carried by the diaphragms to actuate the mechanism, and means to apply independent pressure to the respective diaphragms.

53. A container for a medium under pressure, means to release the medium upon development of a predetermined pressure, an indicator comprising a pivotally supported member forming a portion of the wall of a chamber substantially closed off from the external atmosphere, the exposure of said member constituting the indication to be given, removable means normally covering said pivotally supported member to conceal it from observation, and means to conduct the medium into said chamber upon its release under the predetermined pressure to act upon said pivotally supported member, rotating it about its support so as to remove the concealing means and render the indicator observable.

54. A container for a medium under pressure, means to release the medium upon development of a predetermined pressure, an indicator comprising a pivotally supported member forming a portion of the wall of a chamber substantially closed off from the external atmosphere, the exposure of said member constituting the indication to be given, rupturable means normally concealing the indicator and supporting it against rotation, and means to conduct the medium into said chamber upon its release under the predetermined pressure to act upon the indicator and rupture the concealing means by rotation of the indicator, and thus render the indicator observable.

55. A container for a medium under pressure having a valve body containing means to release the medium, an indicator situated externally of the valve body, a discharge outlet on the valve body, means reciprocatingly movable within the valve body for actuating the releasing means and for normally preventing flow of the released medium through the discharge line, said reciprocatingly movable means having a passage connecting the container with the external atmosphere when the medium is released, and means to actuate the indicator by the medium flowing through said passage.

56. A container for a medium under pressure having a valve body containing means to release the medium, a discharge outlet on the valve body, means reciprocatingly movable within the valve body for actuating the releasing means and for normally preventing flow of the released medium through the discharge line, said means being formed with an extension protruding from the valve body and having a passage connecting the container with the external atmosphere when the medium is released, indicating means secured to the extension to form therewith a chamber normally substantially closed from the atmosphere and communicating with the passage in the reciprocatable means, removable means normally concealing the indicating means, said concealing means being removed by actuation of the indicating means due to a predetermined pressure in the chamber.

57. A container for a medium under pressure having a valve body containing means to release the medium, a discharge outlet on the valve body, means reciprocatingly movable within the valve body for actuating the releasing means and protruding from the valve body, and means associated with the protruding reciprocatingly movable means to indicate by the position of the protruding reciprocatingly movable means with respect to the valve body.

58. A releasing device comprising a series of normally engaged levers adapted to move into disengagement when the device is released, the outermost of said series being connected with a mechanism to be released, a tripping means for holding the innermost lever of the series against the transmitted pull of the part to be released, successive levers of said series having cooperating cam and stop surfaces through which the lever system may be reset by the restoration of the outermost lever to its holding position, and means to hold certain of said levers in non-engaging position until the remainder of the levers have been reset.

59. A tripping device for holding in restraint a series of inter-engaging levers, to the outermost of which is connected the part to be released, and the innermost of which is engaged by the tripping device, comprising a tripping lever pivoted intermediate its ends and formed at one end for engagement with the innermost of said levers, means normally urging the tripping lever into engagement with the innermost lever, and means yieldingly supporting said tripping lever at a single point, said lever being spaced from associated parts and engaging the innermost lever.

60. A tripping device for holding in restraint a series of inter-engaging levers, to the outermost of which is connected the part to be released, and the innermost of which is engaged by the tripping device, comprising a tripping lever pivoted intermediate of its ends and formed at one end for engagement with the innermost of said levers, said end being formed for substantial line contact with the innermost lever and means for dynamically balancing the lever.

61. A tripping device for holding in restraint a series of interengaging levers, to the outermost of which is connected the part to be released, and the innermost of which is engaged by the tripping device, comprising a tripping lever pivoted intermediate of its ends and formed at one end for engagement with the innermost of said levers, said end being adapted for substantial line contact with the innermost lever and the engaging surface of the innermost lever being inclined in a direction requiring a slight movement of the said innermost lever and the tripping lever in the direction of locking before the tripping lever can be disengaged, and means to balance the tripping lever dynamically.

62. A tripping device for holding in restraint a series of inter-engaging levers, to the outermost of which is connected the part to be released, and the innermost of which is engaged by the tripping device, comprising a tripping lever pivoted intermediate of its ends and formed at one end for engagement with the innermost of said levers, said end being adapted for substantial line contact with the innermost lever and the engagement surface of the innermost lever being inclined in a direction requiring a slight movement of the innermost lever in the direction of locking before the tripping lever can be disengaged, means normally urging the tripping lever into engagement with the innermost lever and yielding means yieldingly supporting said tripping lever in a dynamically balanced position spaced from all adjacent parts save the innermost lever and the tripping lever mounting means.

63. In a release device for fluids under pressure having a frangible disc to confine a medium under pressure, a valve body provided with an outlet, a cutter stem movable in the body, and a cutter on the stem to rupture the disc, a spring normally urging the cutter toward the disc, a spindle rotatably mounted in the body, a catch on the cutter stem engaging the spindle, means to prevent movement of the spindle, said means comprising a series of normally engaged levers mounted on the valve body and adapted to move into disengagement when the levers are released, the outermost lever of said series being secured to said spindle, and tripping means for holding the innermost lever of the series against the transmitted force of the spring normally urging the cutter toward the disc.

64. In a release device for fluids under pressure having a frangible disc to confine a medium under pressure, a valve body provided with an outlet, a cutter stem movable in the body, and a cutter on the stem to rupture the disc, a spring normally urging the cutter toward the disc, a spindle rotatably mounted in the body, a catch on the cutter stem engaging the spindle, means to prevent movement of the spindle, said means comprising a series of normally engaged levers mounted on the valve body and designed to move into disengagement when the levers are released, the plane of said series of levers being substantially parallel to the longitudinal axis of the cutter stem, the outermost lever of said series being secured to said spindle, and tripping means for holding the innermost lever of the series against the transmitted force of the spring normally urging the cutter toward the disc.

65. In a release device for fluids under pressure having a fragible disc to confine a medium under pressure, a valve body provided with an outlet, a cutter stem movable in the valve body, and a cutter on the stem to rupture the disc, a spring normally urging the cutter toward the disc, releasable means to normally prevent movement of the cutter, and means to reset the releasable movement preventing means, after operation, to its normal position and subsequently to compress the cutter operating spring to its normal position.

66. A flotation bag carried upon an aircraft, a supply of fluid under pressure for inflating the bag, conducting means for introducing the fluid into the bag, releasing means normally tending to release the fluid into the conducting means, means normally restraining the releasing means, a chambered member associated with the restraining means, and a diaphragm in the chambered member adapted to actuate the restraining means upon immersion of the aircraft in water.

67. A container for a medium under pressure, an outlet, a coupling between the outlet and container, means in the coupling to release the medium, a flange on the releasing means, and a spindle journaled in the coupling, said spindle being formed with a groove, one side of which is adapted to engage the flange to restrain it from movement until released, and the other side of which is adapted to be engaged by the flange to reset the spindle to its restraining position.

68. In a release device for fluids under pressure having a frangible disc to confine a medium under pressure, a body member provided with an outlet, a cutter movable in the body to rupture the disc, a spring to urge the cutter normally toward the disc, and a rotatable spindle in the body engaged by the cutter to prevent movement of the cutter, an arm on the spindle having a pressure surface, a crank arm pivoted on the body member and having a portion cooperating with the pressure surface of the first arm to prevent movement thereof, and means on the crank arm adapted to be engaged by a restraining means to prevent movement thereof.

69. In a release device for fluids under pressure having a frangible disc to confine a medium under pressure, a body member provided with an outlet, a cutter movable in the body to rupture the disc, a spring to urge the cutter normally toward the disc, and a rotatable spindle in the body engaged by the cutter to prevent movement of the cutter, an arm on the spindle having a pressure surface, a crank arm pivoted on the body member and having a portion cooperating with the pressure surface of the first arm to prevent movement thereof, a restraining means engaging the crank arm to prevent movement thereof, and a spring normally urging the last named restraining means to a releasing position.

70. A flotation bag carried upon an aircraft, a supply of fluid under pressure for inflating the bag, releasing means for introducing the fluid into the bag, one or more actuator members, each comprising a chambered member communicating with the atmosphere and located at some point on the aircraft calculated to strike water first upon descent of the aircraft, each actuator member being in communication with the atmosphere, a chambered member associated with the releasing means, diaphragm means in the last named chambered member and adapted to actuate the releasing means, and a conduit for each actuator member communicating between it and the diaphragm means, whereby the latter is actuated by the pressure developed upon submersion of an actuator member.

71. A container for a medium under pressure, an outlet through which the medium is discharged, a chambered coupling between the outlet and container, a nut threaded on the coupling and forming a closure for the coupling chamber, a medium releasing means axially slidable in the coupling and nut, a spring between the nut and releasing means to urge the releasing means toward the container, and means on the medium releasing means engaging the nut to limit movement thereof.

72. In a release device for fluids under pressure having a frangible disc to confine a medium under pressure, a body member provided with an outlet, a cutter movable in the body to rupture the disc, a spring to urge the cutter normally toward the disc, and a rotatable spindle in the body engaged by the cutter to prevent movement of the cutter, an arm on the spindle having a pressure surface, a crank arm pivoted on the body member and having a portion engaging the pressure surface of the first arm to prevent movement thereof, restraining means adapted to engage a portion of the crank arm to prevent movement thereof, and means to release the restraining means.

73. In a release device for fluids under pressure having a frangible disc to confine a medium under pressure, a valve body provided with an outlet, a cutter stem movable in the body, and a cutter on the stem to rupture the disc, a spring normally urging the cutter toward the disc, a spindle rotatably mounted in the body, a catch on the cutter stem engaging the spindle, means to prevent movement of the spindle, said means comprising a series of normally engaged levers mounted on the valve body and adapted to move into disengagement when the levers are released, the outermost lever of said series being secured to said spindle, tripping means for holding the innermost lever of the series against the transmitted force of the spring normally urging the cutter toward the disc, and manually operable means to trip said tripping means.

74. In a release device for fluids under pressure having a frangible disc to confine a medium under pressure, a valve body provided with an outlet, a cutter stem movable in the body, and a cutter on the stem to rupture the disc, a spring normally urging the cutter toward the disc, a spindle rotatably mounted in the body, a catch on the cutter stem engaging the spindle, means to prevent movement of the spindle, said means comprising a series of normally engaged levers mounted on the valve body and adapted to move into disengagement when the levers are released, the outermost lever of said series being secured to said spindle, tripping means for holding the innermost lever of the series against the transmitted force of the spring normally urging the cutter toward the disc, and manually operable means to trip said tripping means, said manually operable means comprising rotatable means normally out of engagement with said tripping means but adapted to be rotated into tripping engagement therewith, a lever connected with said rotatable means for rotating the same, and operating means connected to said lever.

75. In a release device for fluids under pressure having a frangible disc to confine a medium under pressure, a valve body provided with an outlet, a cutter stem movable in the body, and a cutter on the stem to rupture the disc, a spring normally urging the cutter toward the disc, a spindle rotatably mounted in the body, a catch on the cutter stem engaging the spindle, means to prevent movement of the spindle, said means comprising a series of normally engaged levers mounted on the valve body and adapted to move into disengagement when the levers are released, the outermost lever of said series being secured to said spindle, tripping means for holding the innermost lever of the series against the transmitted force of the spring normally urging the cutter toward the disc, and manually operable means to trip said tripping means, said manually operable means comprising rotatable means adapted to be rotated into tripping engagement with said tripping means, means normally yieldingly maintaining the rotatable means out of engagement with the tripping means, a lever connected with said rotatable means for rotating the same, and operating means connected to said lever.

76. In a release device for fluids under pressure having a frangible disc to confine a medium under pressure, a body member provided with an outlet, a puncturing member movable in the body and adapted to rupture the disc, means normally urging the puncturing member toward the disc, releasable means normally restraining the puncturing member against movement, fluid pressure operated means adapted to release the releasable means upon application thereto of fluid pressure, and manually operable means to release the restraining means, said manually operable means comprising rotatable means normally out of engagement with an element of the restraining means but adapted to be rotated into releasing engagement therewith, a lever connected with said rotatable means for rotating the same, and operating means connected to said lever.

77. In a release device for fluids under pressure having a frangible disc to confine a medium under pressure, a body member provided with an outlet, a cutter movable in the body to rupture the disc, a spring engaging the cutter to urge the cutter normally toward the disc, and a rotatable spindle in the body engaged by the cutter to prevent movement of the cutter, an arm on the spindle having a pressure surface, restraining means movable into and out of engagement with the pressure surface of the spindle arm to prevent movement thereof, and manually operable means to release the restraining means, said manually operable means comprising rotatable means normally out of engagement with an element of the restraining means but adapted to be rotated into releasing engagement therewith, a lever connected with said rotatable means for rotating the same, and operating means connected to said lever.

78. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, a tripping means for holding the innermost lever of the series against the transmitted pull of the means to be released, cooperating cam and stop surfaces on successive levers of said series through which the levers may be reset by the restoration of the outermost lever to its restraining position, and means to hold certain of the levers in nonengaging position until the remainder of the levers have been reset.

79. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, means normally urging the outermost lever to a releasing position, a tripping means for holding the inner most lever of the series against the transmitted pull of the means to be released, cooperating cam and stop surfaces on successive levers of said series through which the levers may be reset by the restoration of the outermost lever to its restraining position, and means to hold certain of the levers in nonengaging position until the remainder of the levers have been reset.

80. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, means normally urging the outermost lever to a releasing position, means normally urging the innermost lever to a releasing position, a tripping means for holding the innermost lever of the series against the transmitted pull of the means to be released, cooperating cam and stop surfaces on successive levers of said series through which the levers may be reset by the restoration of the outermost lever to its restraining position, and means to hold certain of the levers in nonengaging position until the remainder of the levers have been reset.

81. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, a tripping means for holding the innermost lever of the series against the transmitted pull of the means to be released, and cooperating cam and stop surfaces on successive levers of said series, through which the lever system may be reset by the restoration of the outermost lever to its restraining position.

82. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, means normally urging the outermost lever to a releasing position, and a tripping means for holding the innermost lever of the series against the transmitted pull of the means to be released, cooperating cam and stop surfaces on successive levers of said series through which the lever system may be reset by the restoration of the outermost lever to its restraining position.

83. A releasing device comprising a series of normally engaged levers adapted to move into disengagement when the device is released, the outermost of said series including a rotatable spindle adapted to engage restrainingly means to be released and having an arm adapted to be engaged by an operatively adjacent lever of the series, means normally urging the outermost lever to a releasing position, means normally urging the innermost lever to a releasing position, and a tripping means for holding the innermost lever of the series against the transmitted pull of the means to be released, cooperating cam and stop surfaces on successive levers of said series through which the lever system may be reset by the restoration of the outermost lever to its restraining position.

84. In a release device for fluids under pressure having a frangible disc to confine a medium under pressure, a body member provided with an outlet, a cutter movable in the body to rupture the disc, a spring to urge the cutter normally toward the disc, and a rotatable spindle in the body engaged by the cutter to prevent movement of the cutter, an arm on the spindle having a pressure surface, pivotally mounted restraining means movable into and out of engagement with the pressure surface of the spindle arm to prevent movement thereof, and means to release the restraining means.

85. In combination with an aircraft structure, a container for a medium under pressure, a release device therefor, an inflatable flotation bag, means to direct the medium into the bag, fluid pressure actuated means for operating the releasing device operative from any one of a plurality of general areas for effecting operation of the releasing device, and a plurality of spaced means to actuate the fluid pressure means, one of said spaced means being located at a point in the aircraft structure below the fuselage so as to strike water upon descent of the aircraft before the fuselage strikes it, the required operating pressure being developed upon submersion of any one of the plurality of spaced means.

DANIEL MAPES.